UNITED STATES PATENT OFFICE.

OSCAR BALLY AND HUGO WOLFF, OF MANNHEIM, GERMANY, ASSIGNORS TO BADISCHE ANILIN & SODA FABRIK, OF LUDWIGSHAFEN-ON-THE-RHINE, GERMANY, A CORPORATION.

REDDISH-BROWN VAT DYES.

1,095,780.     Specification of Letters Patent.     Patented May 5, 1914.

No Drawing. Original application filed December 9, 1911, Serial No. 664,865. Divided and this application filed December 4, 1913. Serial No. 804,715.

*To all whom it may concern:*

Be it known that we, OSCAR BALLY and HUGO WOLFF, citizen, respectively, of the Swiss Republic, and subject of the Grand Duke of Baden, residing at Mannheim, Germany, have invented new and useful Improvements in Reddish-Brown Vat Dyes, which is divided out of our application for patent, Serial No. 664,865, filed December 9, 1911, and of which the following is a specification.

The specification of Patent No. 1,016,604 describes the manufacture of coloring matters by condensing halogenated ketones and diketones, such for instance as benzophenon, benzil and phenanthraquinone, with amino compounds of the anthracene series, whereby coloring matters are obtained which dye cotton, from a vat, from red to violet-brown shades. Similar coloring matters can be obtained by condensing halogen derivatives of di-aryl-sulfones with amino-anthraquinones, and also by condensing halogenated di-aryl-methane derivatives or halogenated fluorenone derivatives with amino-anthraquinones.

We have now found that the condensation product obtainable from dihalogen-phenanthrenequinone and two molecular proportions of 1-amino-anthraquinone, on being treated with a dehydrating agent, can be converted into a coloring matter which dyes cotton from a vat fast reddish brown shades. It is probable that during the reaction the elements of water are removed and inner condensation takes place, so that acridin rings are formed. Thus the formation of coloring matter can probably be represented by the following formulæ:

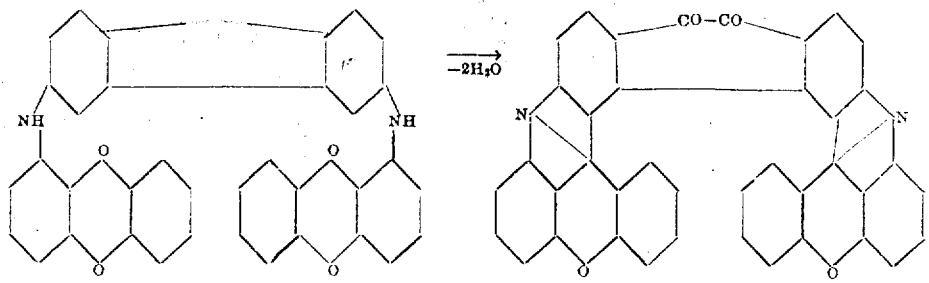

The coloring matters derivable as above described from homologues of 1-amino-anthraquinone possess very similar properties to the coloring matter obtainable from 1-amino-anthraquinone itself, and for the purposes of this invention can be regarded as equivalent thereto.

Our new coloring matters consist, when dry, of brown powders which yield a brownish red solution in concentrated sulfuric acid and a brown solution in 23% fuming sulfuric acid. They yield violet vats in alkaline hydrosulfite solution and from these vats color cotton violet shades which, upon washing and drying, become reddish brown.

The following example will serve to illustrate further the nature of this invention, which, however, is not confined to this example. The parts are by weight. Heat together, for about 1 hour, at from 160° to 165° C., 450 parts of 98% sulfuric acid and 30 parts of the condensation product from dibrom-phenanthrene-quinone (obtainable by treating phenanthrene-quinone with bromin in the presence of nitrobenzene) and 1-amino-anthraquinone (see example 6 of the specification of Patent No. 1,015,604). Then pour the melt into water and work it up by boiling, filtering, washing and drying. The product can be purified by extraction with boiling dilute sodium hypochlorite solution. It is then a brown powder which yields a brownish red solution in concentrated sulfuric acid and a brown solution in 23% fuming sulfuric acid. It is somewhat difficultly soluble in organic solvents, the solution being brown-yellow. It yields a violet vat which colors cotton dark violet shades which, on washing and drying, become reddish brown.

Now what we claim is:—

The new coloring matter of the anthracene series which can be obtained by heating, with sulfuric acid, the condensation product from dibrom-phenanthrene-quinone and 1-amino-anthraquinone, which new coloring matter probably possesses a constitution corresponding to the formula

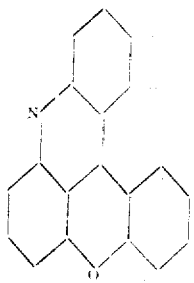 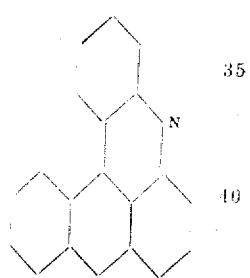

which consists, when dry, of a brown powder which yields a brownish red solution in concentrated sulfuric acid and a brown solution in 23% fuming sulfuric acid, which yields a violet vat in alkaline hydrosulfite solution and from this vat colors cotton violet shades which, upon washing and drying, become reddish brown.

In testimony whereof we have hereunto set our hands in the presence of two subscribing witnesses.

OSCAR BALLY.
HUGO WOLFF.

Witnesses:
J. ALEC. LLOYD,
S. S. BERGER.

Correction in Letters Patent No. 1,095,780.

It is hereby certified that in Letters Patent No. 1,095,780, granted May 5, 1914, upon the application of Oscar Bally and Hugo Wolff, of Mannheim, Germany, for an improvement in "Reddish-Brown Vat Dyes," an error appears in the printed specification requiring correction as follows: Page 1, left-hand formula, top line, in break insert the letters and sign $CO-CO$; and that the said Letters Patent should be read with this correction therein that the same may conform to the record of the case in the Patent Office.

Signed and sealed this 7th day of July, A. D., 1914.

[SEAL.]
R. F. WHITEHEAD,
*Acting Commissioner of Patents.*